United States Patent [19]

Scheithauer

[11] Patent Number: 4,541,552
[45] Date of Patent: Sep. 17, 1985

[54] APPARATUS FOR METERING LIQUIDS OR SEMILIQUIDS

[76] Inventor: Heinz Scheithauer, Winzelnerstrasse 1, 7230 Schramberg, Fed. Rep. of Germany

[21] Appl. No.: 294,249

[22] Filed: Aug. 19, 1981

[30] Foreign Application Priority Data

Aug. 26, 1980 [DE] Fed. Rep. of Germany ....... 3032054

[51] Int. Cl.$^4$ .............................................. B65D 25/38
[52] U.S. Cl. .................................. 222/501; 222/453; 222/518; 401/260; 401/264
[58] Field of Search ............ 222/501, 509, 365, 402.2, 222/453, 149, 424.5, 443, 449, 450, 451, 518, 409; 401/137, 139, 273, 264, 260, 206

[56] References Cited

U.S. PATENT DOCUMENTS

| 141,628 | 8/1873 | Chaput | 222/501 |
| 1,989,738 | 2/1935 | Carson | 222/501 |
| 2,984,393 | 5/1961 | Magnenat | 222/518 X |
| 3,072,299 | 1/1963 | Sessions et al. | 222/501 X |
| 3,190,508 | 6/1965 | Petersen | 222/402.2 |
| 3,283,785 | 11/1966 | Beres et al. | 222/501 X |
| 3,361,301 | 1/1968 | Meshberg | 222/149 |
| 3,467,282 | 9/1969 | Schwartzman | 222/501 X |
| 3,832,071 | 8/1974 | Chaney | 401/260 |

Primary Examiner—Joseph J. Rolla
Assistant Examiner—Kevin P. Shaver
Attorney, Agent, or Firm—Staas & Halsey

[57] ABSTRACT

A device for metering and dispensing liquid or semiliquid mediums, such as adhesives, paints, lacquers, oils, and anaerobic plastics, comprising a tube having a discharge port and a first valve seat with a conical taper thereto inside of the tube adjacent the discharge port, and a valve body slidable within the tube between open and closed positions with the first valve seat. The valve body has a conical tapered end portion which complements the conical taper of the first valve seat of the tube. At least one spring normally biases the valve body to closed position against the first valve seat and a tip is formed on the end of the valve body which extends through the discharge port of the tube and closes it when the valve body is in closed position against the first valve seat. A cylindrical inner wall of the tube connects with the conical taper of the first valve seat and further extends to form a flared storage chamber at the end thereof. The valve body has a cylindrical portion slidable within the cylindrical inner wall of the tube to form a second valve seat between the flared storage chamber and a metering chamber formed between the ends of the valve body with the cylindrical inner wall of the tube for the purpose of controlling the amount of medium dispensed during use of the device.

7 Claims, 7 Drawing Figures

APPARATUS FOR METERING LIQUIDS OR SEMILIQUIDS

BACKGROUND OF THE INVENTION

1. Field of the Invention

The invention relates to an apparatus for metering liquids, or semiliquids, such as adhesives, paints, lacquers, oils, and anaerobic plastics, and comprises a tube having a valve seat in which a valve body is mounted with clearance for sliding in order to open or close a passageway. A bias spring normally maintains the valve body in the closed valve position.

2. Description of the Prior Art

Generally, such type of flow control valves for metering of adhesives, oils, or paints are known in the prior art, and operate much in the manner of wine siphons. This mode of dispensing quantities of adhesives, or an amount of another substance from a disposable package has the drawback that the size of the droplets cannot be determined because of imprecise metering with this type of device. The inaccuracy of metering is further increased by the fact that because the adhesive container is heated by the hand of a person holding it, the volume of the droplets and/or the dispensed quantity is increased. In low-viscosity media, the size of the droplets cannot be determined at all. For instance, this is the case with low-viscosity toluene. Also, certain adhesives, such as cyanoacrylate, cannot be metered at all with known type devices.

SUMMARY OF THE INVENTION

Therefore, a principal object of the present invention is to provide a dispensing apparatus by means of which the size of the droplets, and/or the amount to be dispensed can be metered with precision.

Furthermore, another object is that the dispensing apparatus be suitable for small packages and bottles so that special adhesives, such as cyanoacrylate, can also be dispensed therewith.

According to the present invention, the above and other objects are solved by providing a device for metering and dispensing non-pressurized liquid or semiliquid mediums comprising: (a) a tube including (i) a conical tapered discharge port and (ii) a cylindrical inner wall having a conical tapered inner wall end portion thereto adjacent the discharge port for forming a first metering valve seat, having an opposite end portion to the conical tapered end portion for forming a flared storage chamber for storing a non-pressurized liquid or semiliquid medium, and an intermediate inner wall portion for forming a second metering valve seat; (b) a metering valve body including (i) first and second valve members for interacting respectively with the first and second valve seats to form first and second valves, wherein the second valve member is a cylindrical outer wall end portion slidable within the intermediate inner wall portion of the tube between open and closed valve positions with the second metering valve seat, and wherein the first valve member is a conical outer wall end portion opposite the cylindrical end portion, complementing the conical tapered inner wall end portion of the first metering valve seat and selectively moveable between different open and closed valve positions with the first metering valve seat, an annular duct being formed between the conical tapered end portions of the valve body and seat in the open valve position, and (ii) metering means on the valve body for forming a sealed metering medium chamber between the valve members of the valve body and the valve seats of the tube cylindrical inner wall, the chamber being sealed at one end by the conical outer wall end portion of the valve body engaging the conical tapered inner wall end portion of the first valve seat and at the other end by the cylindrical outer wall end portion engaging the cylindrical inner wall of the tube for holding a predetermined amount of liquid or semiliquid medium therein when the first and second valves are in normally-closed positions and for dispensing the predetermined amount of medium when the valve formed by the first valve seat is in an open position; (c) at least one spring for normally biasing the valve body to closed medium sealing positions against the first and second valve seats of the tube; and (d) a conical tapered tip on the end of the valve body which extends through and complements the conical tapered tube discharge port and sealingly closes the tube discharge port when the valve body is spring-biased in the closed position against the first valve seat, the tip being manually actuated against the spring for selectively moving the valve body inwardly to a selected open valve position away from the first valve seat, wherein the inward movement of the tip regulates the width of the annular duct formed between the conical tapered wall end portion of the metering valve body and first valve seat for selecting the amount of liquid or semiliquid medium to be discharged from the metering chamber and determines whether the valve body is in an open valve position away from the second valve seat such that the metering chamber is in medium communication with said flared storage chamber.

In a preferred embodiment of the invention, the dispenser tube has an outer shape like that of a pen or a stylus.

Compared with prior art flow control valves, the metering and dispensing device of the present invention has the advantage that practically any liquid or semiliquid, particularly adhesives, oils, paints or lacquers, can be dispensed therewith in portions that are measured with great precision.

Bobbing of the flow control valve of the device of this invention during the dispensing process is made impossible. In addition, the metering and dispensing device embodying the present invention permits the use of critical substances, such as cyanoacrylate.

In one preferred embodiment of the invention, the metering means of the valve body comprises a ring groove formed in the intermediate circumferential cylindrical area of the valve body for forming the metering chamber with the intermediate cylindrical inner wall portion of the dispenser tube. In a modification of this embodiment, the metering means comprises metering grooves formed in the circumferential cylindrical area of the valve body and which run parallel to the longitudinal axis thereof instead of traversely thereof as does the ring groove. Because of either the traverse ring groove, or the parallel, longitudinal metering grooves, the quantity of material to be dispensed can be proportioned with very great precision. Specifically, it is possible to control the metered quantity in such a way that no more medium can flow from the main storage chamber to the metering medium chamber. Thus, by pressing the tip of the valve body more or less deeply into the tube, the amount of the substance to be dispensed can be metered exactly, and the dispensing time can also be adapted to particular conditions.

Another important feature of the present invention is that the inner wall of the discharge port has the tapered conical configuration, and the tip of the valve body complementarily tapers conically; thus, the tip portion adjacent to the conical part of the valve body also sealing closes the discharge port when the valve passage is closed. A clean closing of the discharge port is ensured at all times because of the passage of the tip through the discharge port, and the discharge port can no longer be clogged with adhesive accumulation after the adhesive has been dispensed. Likewise, the discharge port can no longer dry up when paints or lacquers are being dispensed, because of the tip closing sealingly along with the closure of the valve passage.

Furthermore, the springs for biasing the valve body to the closed position may be plastic springs which function as compression springs.

These together with other objects and advantages which will become subsequently apparent reside in the details of construction and operation as more fully hereinafter described and claimed, reference being had to the accomanying drawings forming a part hereof, wherein like numerals refer to like parts throughout.

BRIEF DESCRIPTION OF THE DRAWINGS

FIGS. 1A and 1B are cross-sectional side elevational views of a dispensing apparatus including a valve body in accordance with the invention, wherein FIG. 1A shows the device being used for styluses, and FIG. 1B shows the device being used with a bottle;

FIG. 4A being for styluses, and FIG. 4B being for bottles.

DESCRIPTION OF THE PREFERRED EMBODIMENTS

Figure 1A:
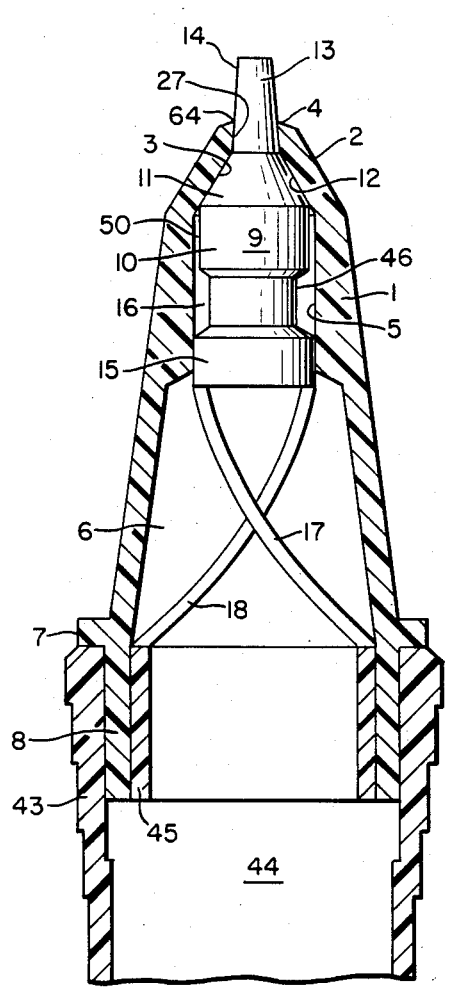
Figure 1B:
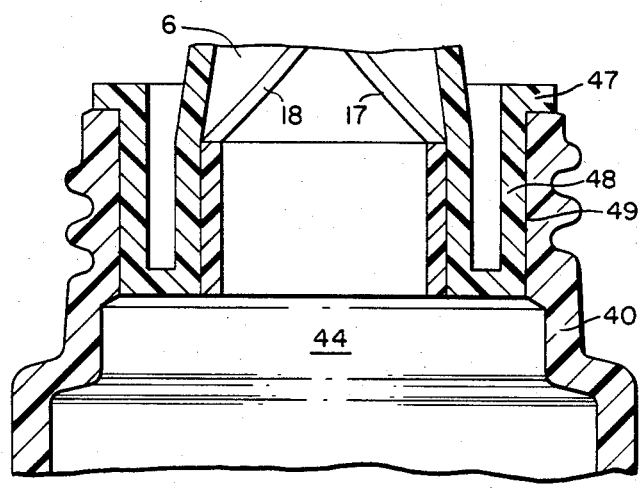

As shown in the preferred embodiment of FIGS. 1A and 1B, the device for metering and dispensing non-pressurized liquid or semiliquid mediums comprises a pen-shaped dispenser tube 1 with a stop ring 7 and an extension seat portion 8 for insertion into the open end of a stylus 43, or a dispenser tube with a cup seal 48 for insertion into the opening in a bottle 40, preferably for holding between the finger tips like a pencil or ball point pen. Thus, a primary liquid storage chamber 44 is formed in the interior thereof.

The dispenser tube I has at its outer conically tapering end 2 a central discharge port 4. The tube 1 also includes a cylindrical inner wall having an inner wall end portion for forming a first internally arranged metering valve seat 3 which tapers conically to the discharge port 4. Also inside of tube 1 is a cylindrical (non-tapered) intermediate inner wall portion 5 for forming a second metering valve seat, inside of which is a slidable valve body 9. The cylindrical intermediate inner wall 5 is joined with the conically tapering valve seat 3. A flaring storage chamber 6 is in turn formed at the end portion of the tube opposite the conically tapered end portion and is joined with the cylindrical inner wall 5. The storage chamber 6 can, for example, be filled from the remaining space in the tube, and from the stylus or bottle, and serves to store the liquid or substance to be dispensed. Tube 1 has a stop ring 7 for limiting entry of an extension seat portion 8 into the stylus 43, as shown in FIG. 1A, or has a cup seal 48 with stop ring 47 for limiting entry into a bottle 40, as shown in FIG. 1B.

The valve body 9 is provided with a first valve member comprising a conically tapering leading or front outer wall end portion 11 which has a surface 12 fitting against and complementing the conical taper surface of the first valve seat 3 for forming a first valve and a valve passage or annular duct when in an open valve position. When the valve passage is closed, the valve body portion 11 is everywhere in tight fitting engagement with the valve seat 3. A tip 13 centrally placed on conical front end portion 11, is integral therewith, and extends through the discharge port 4 of the tube 1 and closes the discharge port 4 when the valve passage is closed. To this end, the wall 27 of the discharge port 4 also has a conically tapering configuration with the same inclination as that of a tapered surface 14 of the tip 13. Thus, when the valve passage is closed by the front end portion 11 of the valve body, the surface part 14 of the tip 13 adjacent to the conical front part 11 thrusts sealingly against the tapered wall 27 of the discharge port 4. The valve body 9 has a cylindrical outer wall area extending from front portion 11. This cylindrical area has metering means comprising a circumferential ring groove 46, which forms with the intermediate cylindrical inner wall portion 5 of the tube 1 a metering chamber 16. Hence, this ring groove 46 divides the cylindrical outer wall area of the valve body 9 into a central cylindrical portion 10 and a rear cylindrical portion 15. The portion 15 forms a second valve member of the valve body 9 and slidably moves against the second metering valve seat comprising intermediate inner wall portion 5 of the tube 1 to form a second valve with open and closing medium communication positions between chambers 6 and 16.

It thus can be seen that the metering chamber 16 is sealed at one end by the conical outer wall end portion 11 of the valve body engaging a conically tapered inner wall end portion of the valve seat 3, and at the other end by the cylindrical outer wall end portion 15 engaging the cylindrical inner wall 5 of the tube for holding a predetermined amount of liquid or semiconductor medium therein when the valves formed at the opposite ends of the valve body are in normally-closed positions and for dispensing a predetermined amount of medium when the valve formed by the valve seat 3 is in an open position.

Two plastic springs 17 and 18 act on the valve body 9 to bias the two valves formed at opposite ends of valve body 9 to normally-closed positions. The other ends of springs 17 and 18 bear on the inner side of an insert ring 45.

The space denoted in FIG. 1A by the reference numeral 50 is the so-called nozzle space.

The metering apparatus shown in the preferred embodiment of FIGS. 1A and 1B operates as follows:

The storage chamber 6 is filled with the medium or the liquid to be dispensed. Now, when the device is operated, the tip 13 is manually selectively pressed, and thereby the valve body 9 moves inwardly against the bias action of the springs 17 and 18, and the conical tapered surface 14 of the tip 13 separates from the inner conical surface 27 of the discharge port 4. The front conical portion 11 of the valve body 9 also simultaneously separates from the tapering inner surface of the valve seat 3. Under further pressure on the tip 13 in use, the valve body 9 is moved further toward the storage chamber 6 until the ring groove 46 is at least partly in communication with the storage chamber 6. The liquid or substance to be dispensed can now flow into the annular space of metering chamber 16 as formed between the ring groove 46 and the cylindrical inner wall 5 of tube 1. After the metering chamber 16 is filled, pressure on the tip 13 of the device is reduced, and the valve body 9 moves forward again, whereupon the rear cylindrical portion 15 of the valve body 9 halts further flow of the medium from chamber 6, and sealingly closes the metering chamber 16. The medium in the metering chamber 16 can now be dispensed via the nozzle space 50 between the central portion 10 of the valve body 9 and the inner wall 15, the valve seat 3 and the discharge port 4, with the medium being appropriately distributed by means of the tip 13. More specifically, the tip 13 can be manually actuated by the operator against the springs 17 and 18 for selectively moving valve body 9 inwardly to a selected open valve position away from the valve seat 3, wherein the inward movement of the tip 13 regulates the width of the annular duct formed between the conical tapered wall end portion 11 of the metering valve body 9 and the valve seat 3 for selecting the amount of liquid or semiliquid medium to be discharged from the metering chamber 16 and determines whether the valve body 9 is in an open valve position away from the valve seat at end 15 such that the metering chamber 16 is in medium communication with the flared storage chamber 6.

The outside diameter of the central cylindrical portion 10 of the valve body 9 is smaller than the inside diameter of the cylindrical interior wall 15 of the tube 1, and smaller than the diameter of the rear cylindrical part 15 of the valve body 9, so that the medium can flow past the central cylindrical part 10 of the valve body 9 after further flow from the reservoir 6 is stopped. Or, rather than being of smaller diameter, the central cylindrical part 10 of the valve body may have, for this purpose, a longitudinal groove or a plurality of longitudinal grooves therein such as in the embodiment of FIGS. 2 and 3 described below.

If more medium is needed, the valve body 9 is simply pressed inwardly again, so that again a measured portion can flow from the storage chamber 16 into the metering chamber 6.

Figure 2:
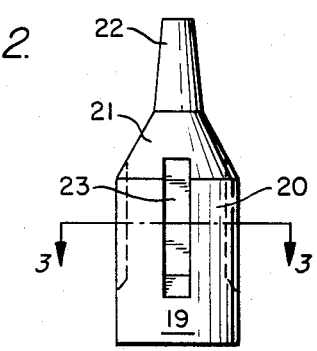
FIG. 2 is a side view of another valve body of the dispensing apparatus as modified from the valve body of FIG. 1A.

FIG. 2 shows another embodiment for the valve body a valve body 19, a central conical part 21 of which, together with a tip 22 joined up therewith, is designed similar to and with corresponding parts like those of the valve body 9. However, instead of a ring groove, a cylindrical part 20 of the valve body 19 has metering chambers 23, 24, 25 and 26, which run parallel to the longitudinal axis of the body 19, and, for example, are in the form of narrow grooves for accurately metering the medium to be dispensed. The grooves each exit and join up with the central conical part 21 of the valve body 19.

Figure 3:
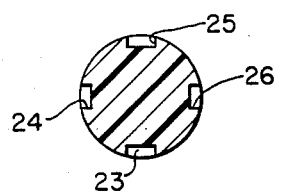
FIG. 3 is a cross-sectional view of the valve body of FIG. 2, taken along lines 3—3 of FIG. 2.

FIG. 3 is a cross-sectional view taken along the line 3—3 of FIG. 2 to illustrate the position of these metering chambeer grooves 23, 24, 25 and 26 at 90° spacing around the body. Of course, this valve body 19 also is inserted into a dispenser tube 1 to cooperate therewith in a similar manner to that already described for the embodiment shown in FIGS. 1A and 1B.

Figure 4A:
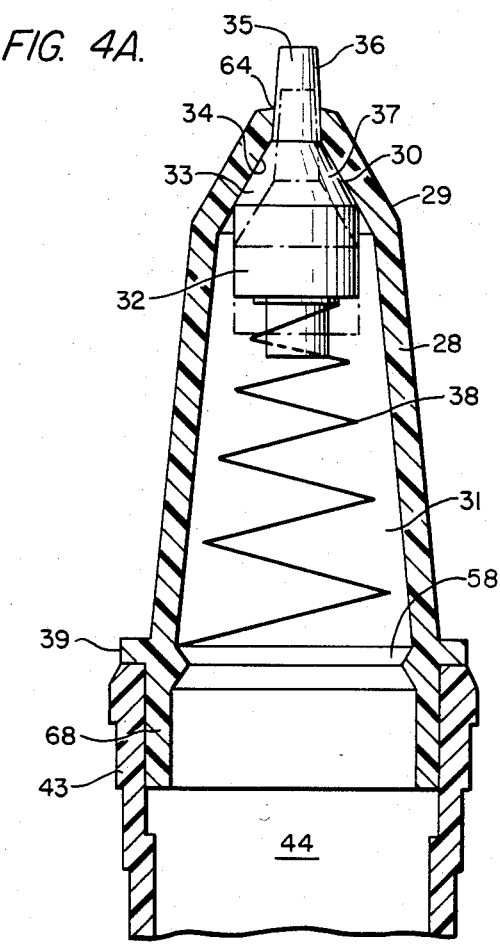
FIGS. 4A and 4B are longitudinal cross-sectional side elevational views of another embodiment of a dispensing apparatus.
Figure 4B:
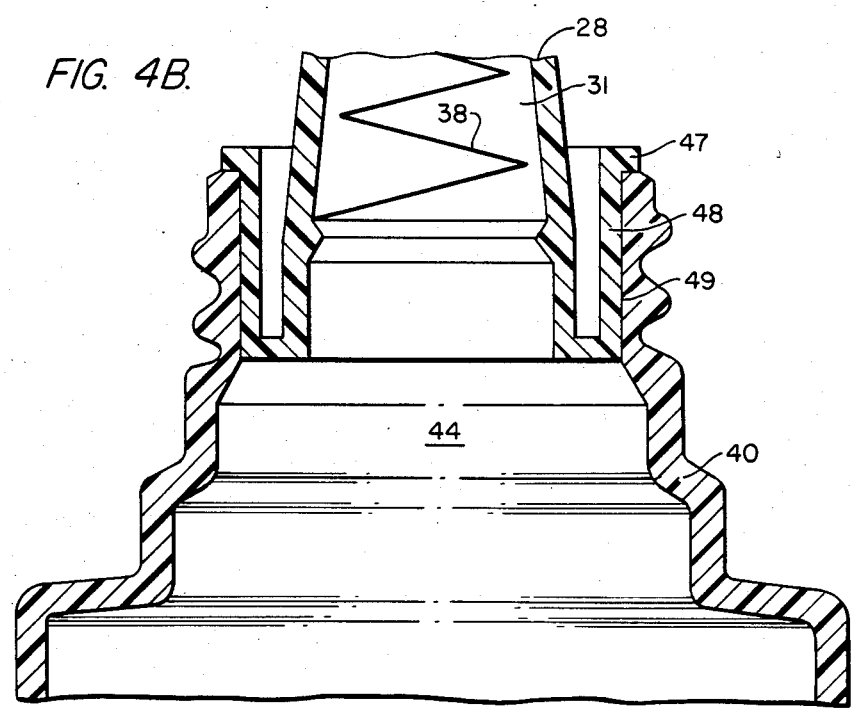

FIGS. 4A and 4B show another embodiment of the dispensing device as provided by the present invention, which includes a dispenser tube 28 provides with a conically tapering end 29. Inside the tube there is a valve seat 30 having a conical inner surface 34. The discharge port 64 for the medium is joined up with valve seat 30. A stop ring 39 (FIG. 4A) functions in combination with extension seat portion 68 to limit insertion of the tube 28 into a stylus 43.

A valve body 32 is placed within the valve seat 30. This valve body 32 has a central conical part 33 which fits snugly into the valve seat 30. Therefore, the conical surface 37 of central conical part 33 has the same inclination as the surface 34 of the valve seat 30. As with the valve bodies of FIGS. 1A, 1B and 2, there is integral with the central part 33 a tapering tip 36 in a conical configuration. The tip 35 has the same function as the tips 13 and 22 of the valve bodies 9 and 19, already described, so that reference can be made to this previous description.

A compression spring 38 acts on the valve body 32 and bears at the other end in a spring retention abutment 58 at the far end of the storage chamber 31. The tube 28 of FIG. 4A also has an extended seat portion 68 for insertion into the open end of stylus 43. The tube 28 of FIG. 4B also has a stop ring 47 with a cup seal 48 for a bottle 40. The valve body 32 of FIGS. 4A and 4B differs from the metering devices of FIGS. 1A, 1B and 2 only in that in this case there is no metering and no separation of a portion of the substance being consumed. However, the metering device of FIG. 4 can advantageously be employed without interruption for certain applications.

Figure 5:
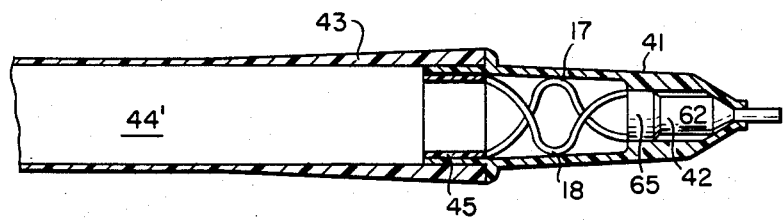
FIG. 5 is a longitudinal section of a further embodiment of a dispensing apparatus together with a formed holding stylus.

FIG. 5 shows another embodiment of the metering and dispensing device embodying the invention, which is very similar to the embodiment shown in FIG. 1. Tube 41 is shaped like tube 1 of FIG. 1, a flow control valve 42 being arranged in tube 41. This embodiment does not use a central cylinder of reduced diameter, like 10 of FIG. 1A, nor metering grooves like 23–26 of FIGS. 2 and 3, but has a front portion 62 like 32 of FIG. 4A, and a rear cylinder 65 like 15 of FIG. 1A. A stylus 43 is mounted on tube 41, forming a storage chamber 44 in the interior thereof. The design and operation of this embodiment correspond to those already described to which reference is made.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

What is claimed as new is as follows:

1. A device for metering and dispensing non-pressurized liquid or semiliquid mediums comprising:
    (a) a tube including (i) a conical tapered discharge port and (ii) a cylindrical inner wall having a conical tapered inner wall end portion thereto adjacent said discharge port for forming a first metering valve seat, said tube having an opposite end portion to said conical tapered end portion for forming a flared storage chamber for storing a non-pressurized liquid or semiliquid medium, and an intermediate inner wall portion of the cylindrical inner wall of the tube for forming a second metering valve seat;

(b) a metering valve body including (i) first and second valve members for interacting respectively with said first and second valve seats to form first and second valves, wherein the second valve member is a cylindrical outer wall end portion slidable within the intermediate inner wall portion between open and closed valve positions with said second metering valve seat, and wherein the first valve member is a conical outer wall end portion opposite the cylindrical end portion, complementing said conical tapered inner wall end portion of said first metering valve seat and selectively movable between open and closed valve positions with said first metering valve seat, an annular duct being formed between the conical tapered end portions of said valve body and said first valve seat in the open valve portion, and (ii) metering means on said valve body for forming a sealed metering medium chamber between said valve members of the valve body and said valve seats, the chamber being sealed at one end by the conical outer wall end portion of the valve body engaging the conical tapered inner wall end portion of the valve seat and at the other end by the cylindrical outer wall end portion engaging the cylindrical inner wall of the tube for holding a predetermined amount of liquid or semi-liquid medium therein when the first and second valves are in normally-closed positions and for dispensing the predetermined amount of medium when the first valve is in an open position;

(c) at least one spring for normally biasing said valve body to closed medium sealing positions against the first and second valve seats of said tube; and (d) a conical tapered tip on the end of said valve body which extends through and complements said conical tapered discharge port and sealingly closes said tube discharge port when the valve body is spring-biased in the closed position against the first valve seat, said tip being manually actuated against the spring for selectively moving the valve body inwardly to a selected open valve position away from the first valve seat, wherein the inward movement of the tip regulates the width of the annular duct formed between the conical tapered wall end portion of the metering valve body and first valve seat for selecting the amount of liquid or semiliquid medium to be discharged from the metering chamber and determines whether the valve body is in an open valve position away from the second valve seat such that the metering chamber is in medium communication with said flared storage chamber.

2. The device of claim 1, wherein said valve metering means formed in said valve body comprises a circumferential ring around the valve body, said ring being in liquid communication with said flared storage chamber when the tip is moved inwardly a predetermined amount.

3. The device of claim 1, wherein said metering means comprises at least one groove lengthwise of the valve body and substantially parallel to the longitudinal axis thereof, said groove being in liquid communication with said flared storage chamber when the tip is moved inwardly a predetermined amount.

4. The device of claim 1, wherein the tube has an outer configuration in the shape of a pen or stylus.

5. The device as set forth in claim 1, wherein said at least one spring has one end acting against said valve body opposite the tip for biasing said valve body into closed valve positions and wherein said device further comprises retention means provided within said tube for retaining the other end of said spring.

6. The device of claim 5, wherein said at least one spring comprises two springs formed of plastic material, and said retention means within said tube comprises an insert ring connected to said two springs.

7. The device of claim 5, wherein said at least one spring is a metal coil compression spring for biasing said valve body into the closed valve positions, and said retention means within said tube comprises a spring retention abutment.

* * * * *